United States Patent
Falkenberg et al.

(10) Patent No.: US 6,526,428 B2
(45) Date of Patent: Feb. 25, 2003

(54) METHOD AND APPARATUS FOR DETERMINING INTERPOLATED INTERMEDIATE VALUES OF A SAMPLED SIGNAL

(75) Inventors: Andreas Falkenberg, Hagen (DE); Ulf Niemeyer, Bochum (DE); Christoph Rohe, Bochum (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/036,246

(22) Filed: Oct. 22, 2001

(65) Prior Publication Data

US 2002/0152249 A1 Oct. 17, 2002

Related U.S. Application Data

(63) Continuation of application No. PCT/DE00/01003, filed on Apr. 3, 2000.

(30) Foreign Application Priority Data

Apr. 22, 1999 (DE) .......................... 199 18 320

(51) Int. Cl.$^7$ ................................. G06F 7/38
(52) U.S. Cl. ....................................... 708/290
(58) Field of Search ................. 708/270, 290

(56) References Cited

U.S. PATENT DOCUMENTS

| 5,502,662 | A |   | 3/1996 | Greggain |         |
|-----------|---|---|--------|----------|---------|
| 5,949,695 | A | * | 9/1999 | Snell    | 708/290 |

FOREIGN PATENT DOCUMENTS

| DE | 21 35 590      | 1/1972 |
|----|----------------|--------|
| EP | 0 853 292 A2   | 7/1998 |
| WO | WO 95/17728    | 6/1995 |

\* cited by examiner

*Primary Examiner*—Tan V. Mai
(74) *Attorney, Agent, or Firm*—Laurence A. Greenberg; Werner H. Stemer; Gregory L. Mayback

(57) ABSTRACT

A method and apparatus determines interpolated intermediated values of a sampled signal. In order to determine interpolated intermediate values of a sampled signal, such as a digital mobile radio signal, the parameters a, b and c of the second-order polynomial $y=ax^2+bx+c$ are determined starting from three known sample values $(x_1, y_1)$, $(x_2, y_2)$ and $(x_3, y_3)$, so that intermediate values can be calculated using the polynomial. Here it is assumed that the signal is sampled at constant intervals, in particular at intervals normalized to $d=1$, and the center sample value is assigned to the sampling instant $x_2=0$, by which, a calculation can be carried out with low hardware complexity.

23 Claims, 4 Drawing Sheets

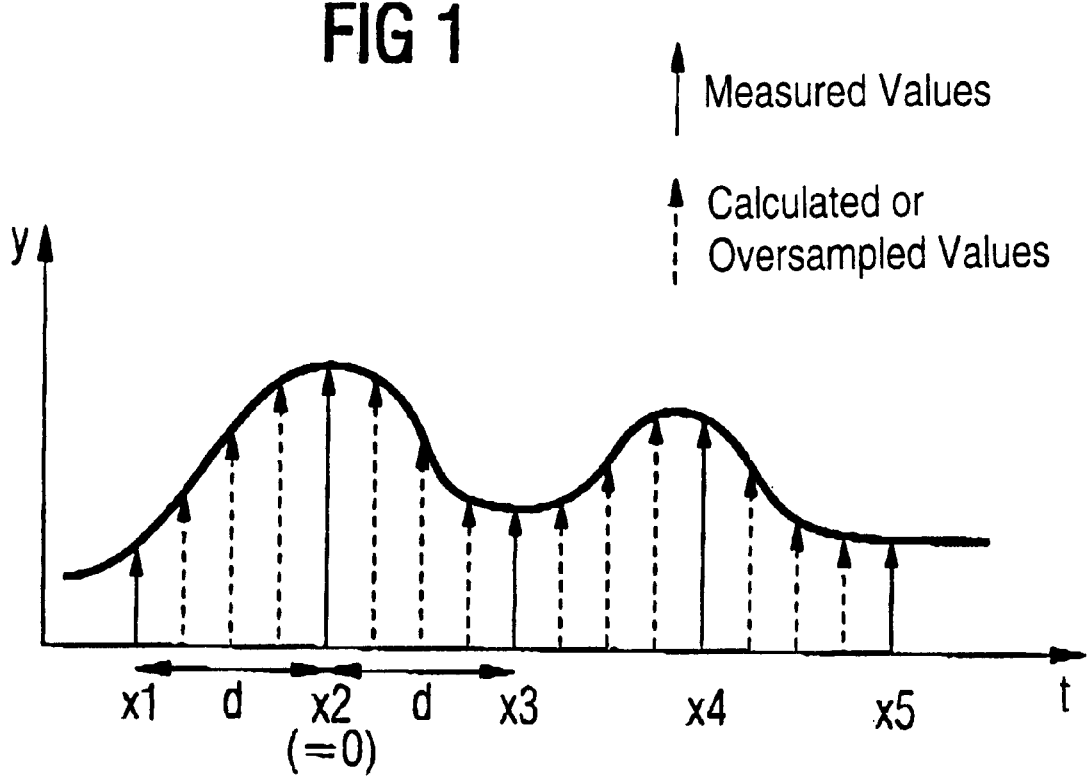
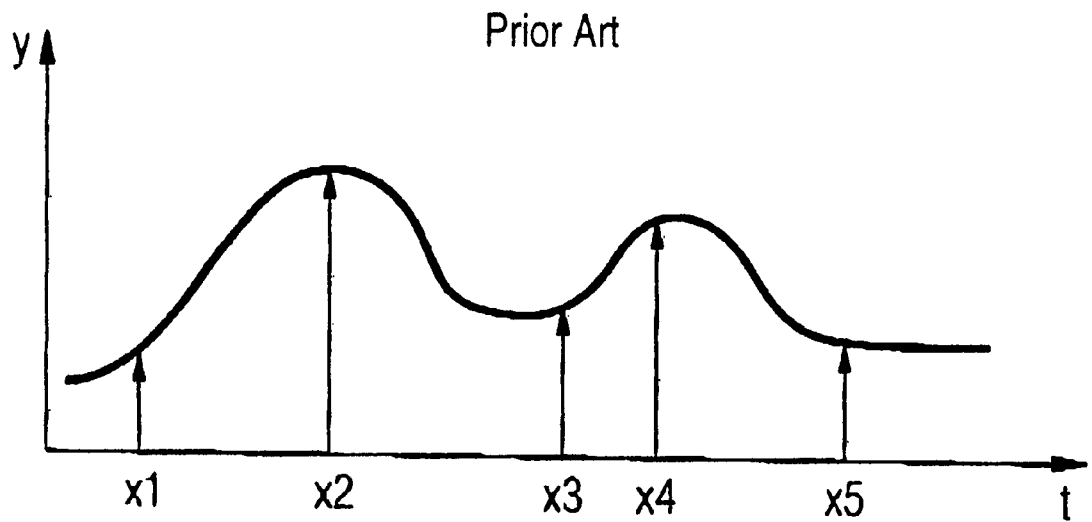

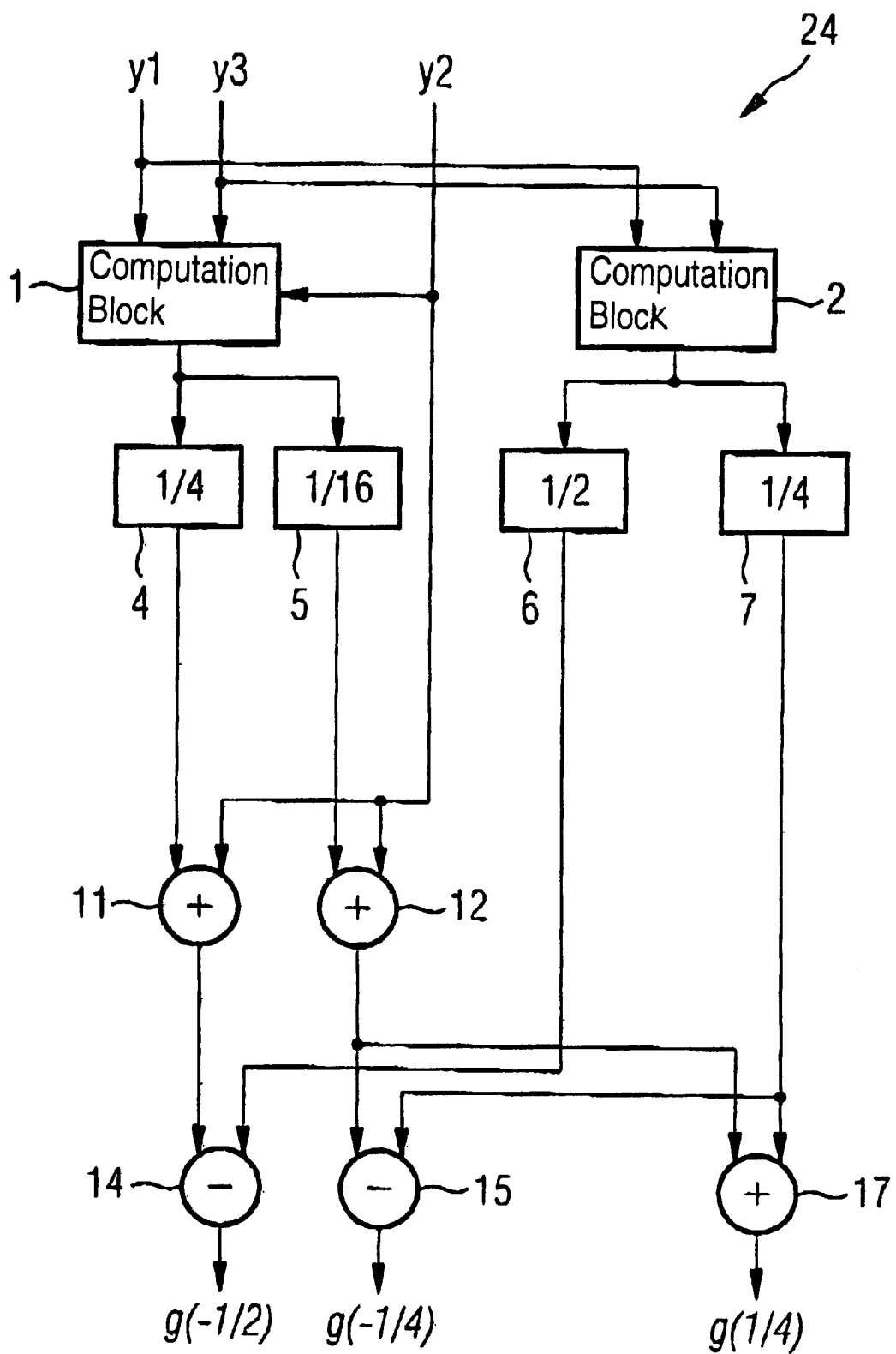

METHOD AND APPARATUS FOR DETERMINING INTERPOLATED INTERMEDIATE VALUES OF A SAMPLED SIGNAL

CROSS-REFERENCE TO RELATED APPLICATION

This application is a continuation of copending International Application No. PCT/DE00/01003, filed Apr. 3, 2000, which designated the United States.

BACKGROUND OF THE INVENTION

FIELD OF THE INVENTION

The present invention relates to a method and an apparatus for determining interpolated intermediate values of a sampled signal, in particular a mobile radio signal.

The interpolated intermediate values of a sampled signal need to be determined wherever only a limited number of sample values of the signal are available as a result of certain limitations. For example, there is a need to calculate interpolated values at different points in the field of computer graphics or the field of digital mobile radio. In particular, an estimate of intermediate values by interpolation is required in the field of mobile radio because only a small number of sample values are available at specific points to be used for analysis of a received signal.

Essentially, the aim of interpolation is to determine a continuous curve or line that passes through a certain number of known points or sample values. The desired intermediate values can then be determined using the line that is now known.

In the following it is assumed that three sample values of the signal for analysis are known, which can be represented by three value pairs $(x_1, y_1)$, $(x_2, y_2)$ and $(x_3, y_3)$, where—as shown in FIG. 2—the x-values correspond to the sampling instant and the y-values to the associated signal value. The time intervals between each of the sample values may be different.

Given three known sample values or sample pairs, an interpolation can be carried out by using the second-order polynomial $y=ax^2+bx+c$, since the three unknown parameters a, b, and c can be found from the three known value pairs. The following equation system must therefore be solved as efficiently as possible:

$$y_1=ax_1^2+bx_1+c$$

$$y_2=ax_2^2+bx_2+c$$

$$y_3=ax_3^2+bx_3+c$$

The required parameters a, b, and c can thus be found using these three equations, so that then any other intermediate value can be calculated using the general relationship $$y=ax^2+bx+c.$$

Because more than three sample values are usually known, for instance the additional value pairs $(x_4, y_4)$ and $(x_5, y_5)$ in FIG. 2, curve sections are calculated for every three sample values, which are then pieced together. Here, one curve section is calculated from the sample values $(x_1, y_1)$, $(x_2, y_2)$ and $(x_3, y_3)$, and the other curve section from the sample values $(x_3, y_3)$, $(x_4, y_4)$, and $(x_5, y_5)$ In order to avoid any discontinuity at the point of intersection $(x_3, y_3)$ between the two curve sections, the calculation can incorporate the gradient of the curve, which is defined by the first derivative at the point concerned. The gradient m of the second-order polynomial cited above is given in general by $$m=2ax+b$$

The method described above is relatively involved.

U.S. Pat. No. 5,502,662 to Greggain representing the latest prior art, describes an interpolator in which square-law curve interpolation is carried out on a set of three sample points. In order to avoid problems with matching the interpolation curves to adjacent sets of sample points, intermediate values between the sample points are first generated by linear interpolation, and are then used as nodes for the square-law interpolation.

SUMMARY OF THE INVENTION

It is accordingly an object of the invention to provide a method and apparatus for determining interpolated intermediate values of a sampled signal that overcomes the hereinafore-mentioned disadvantages of the heretofore-known devices of this general type and that determines interpolated intermediate values of a sampled signal, which enables intermediate values to be determined or calculated by a simple method and apparatus with low hardware complexity.

With the foregoing and other objects in view, there is provided, in accordance with the invention, a method for determining interpolated intermediate values of a sampled signal. The first step of the method is sampling the signal to obtain at least three known samples of the signal forming value pairs $(x_1, y_1)$, $(x_2, y_2)$, and $(x_3, y_3)$ respectively. The next step is determining from the three known sample values the parameters a, b, and c of the second-order polynomial $y=ax^2+bx+c$. The next step is calculating desired intermediate values from the polynomial after determining the parameters of the polynomial, in which the three known sample values are obtained by sampling the signal at constant intervals d. The center sample value is assigned the sampling instant $x_2=0$, and the interval d between the known sample values is normalized to $d=1$, so that the desired intermediate values are calculated from the second-order polynomial using $$a = \frac{y_1 + y_3}{2} - y_2, \quad b = \frac{y_3 - y_1}{2}$$

and $c=y_2$. The next step is choosing the x-values of the desired intermediate values such that the related y-values of the desired intermediate values represented by the second-order polynomial have only quotients with a power of 2 as denominators.

With the objects of the invention in view, there is also provided an apparatus for determining interpolated intermediate values of a sampled signal according to the previously described method. The apparatus includes a first computation block (1) for calculating the value $$\frac{y_1 + y_3}{2} - y_2.$$

The apparatus also includes a second computation block (2) for Calculating the value $$\frac{y_3 - y_1}{2},$$

the x-values of the desired intermediate values whose y-values represented by the polynomial have only quotients with a power of 2 as denominators.

With the objects of the invention in view, there is also provided a use for the above-described method. The use is determining interpolated intermediate values of a sampled digital mobile radio signal.

The present invention relates to the determination or calculation of interpolated intermediate values of a signal in a special situation that arises frequently in the field of mobile communications in particular, so that the solution according to the invention can be applied with almost no loss of generality.

Firstly, according to this invention, it is assumed that the signal is sampled at constant intervals. Secondly, the center sampling instant is defined as $x_2=0$ so that resultant expressions for the unknown parameters a, b and c of the second-order polynomial $y=ax^2+bx+c$ to be found, can be evaluated with little effort from the known sample values $y_1$, $y_2$, and $y_3$. Thirdly, the constant interval between the known sample points is normalized with respect to 1, so that the intermediate values are determined in the range $[-1, 1]$ about $x_2=0$. The x-values of the desired intermediate values are chosen such that expressions are obtained for the corresponding y-values using the determined polynomial that contain only quotients having denominators that can be represented by a power of 2. This enables a simple, optimized hardware implementation of the interpolator, in which several circuit elements are used more than once, and divisions are not carried out explicitly, but are implemented by shifting the data lines or by renaming the relevant bits, so that no additional hardware is required for this. In addition, multiplications are not carried out as such, but are replaced by far simpler and cleverly selected additions.

The present invention can be used in particular for the analysis of a digital received signal in digital mobile radio systems such as UMTS terminals (Universal Mobile Telecommunication System).

Other features that are considered as characteristic for the invention are set forth in the appended claims.

Although the invention is illustrated and described herein as embodied in a method and apparatus for determining interpolated intermediate values of a sampled signal, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a graph explaining the method according to the invention;

FIG. 2 is a graph showing a prior art sampling and interpolation of a signal;

FIG. 6 is a block diagram showing a second embodiment of an interpolator.

DESCRIPTION OF THE PREFERRED EMBODIMENTS

Figure 3:
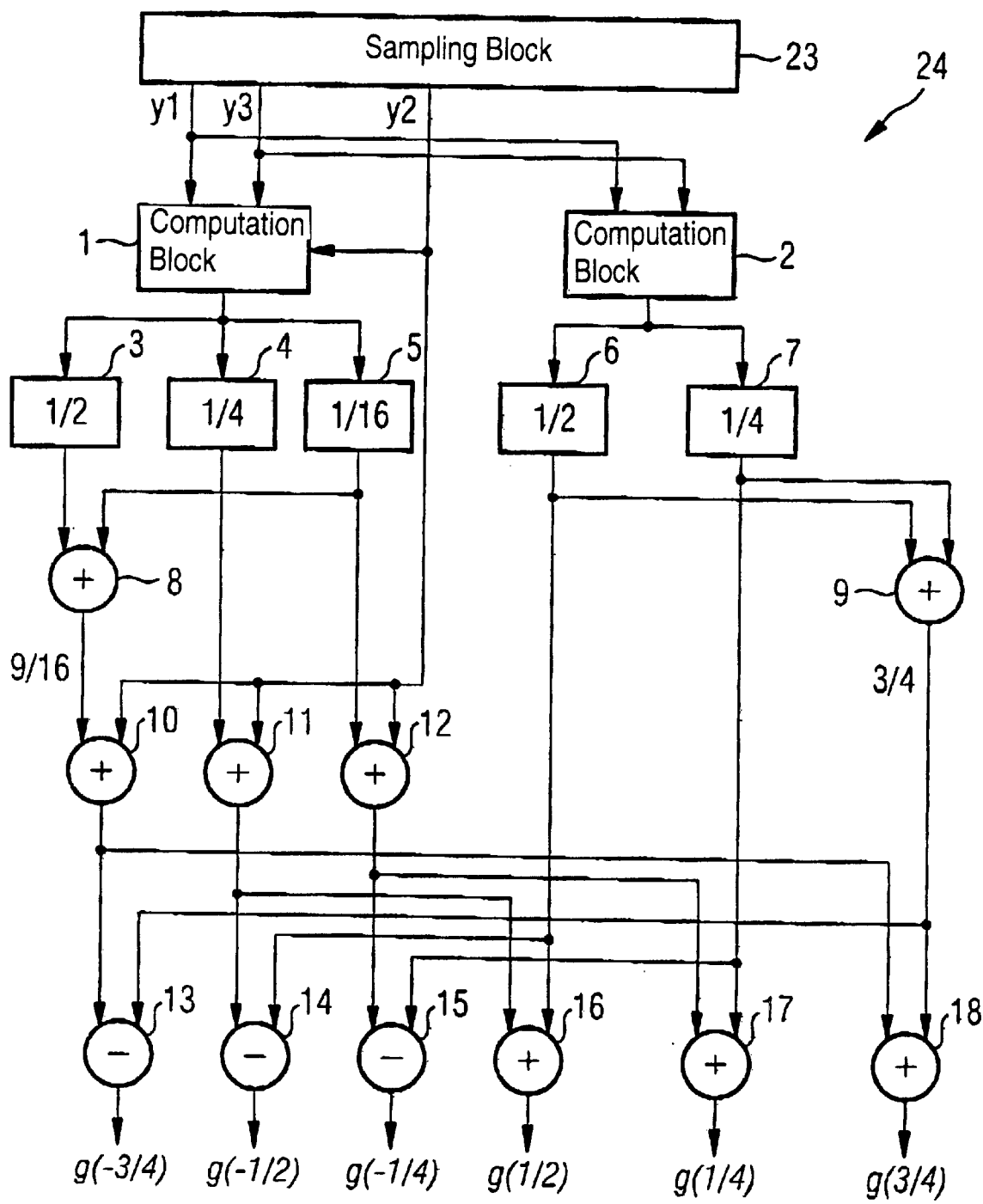
FIG. 3 is a block diagram of a first embodiment of an interpolator.

Referring now to the figures of the drawings in detail and first, particularly to FIG. 1 thereof, there is shown a signal to be analyzed, which is sampled at constant intervals d, i.e.:

$$D = x_2 - x_1 = x_3 - x_2$$

In FIG. 1, the known measured or sampled value-pairs thus obtained are represented by solid arrows. These known sample values are now meant to be used only to reconstruct a few discrete intermediate values of the corresponding signal curve that runs through the known sample values, these intermediate values being represented by dashed arrows in FIG. 1. This is particularly necessary if the signal cannot be sampled at a rate with any given precision, or if finite measurement is accuracy is not required, which is the case for applications in digital mobile radio.

FIG. 1 shows the case of fourfold oversampling, i.e. six intervening intermediate values are calculated by interpolation from the three adjacent known sample values $(x_1, y_1)$, $(x_2, y_2)$, and $(x_3, y_3)$. In a further step, the known value pairs $(x_1, y_1)$, $(x_2, y_2)$, and $(x_3, y_3)$ are replaced by $(x_2, y_2)$, $(x_3, y_3)$, and $(x_4, y_4)$, i.e. three new adjacent sample values are used for further interpolation, in which the new sample values are shifted by d with respect to the previous sample values. Intermediate values between $x_2$ and $x_4$ can then be calculated in a similar way.

Discontinuities are allowed for the purposes of the present invention, because a continuous function is not intended to be generated.

As a further simplification, the sampling instant of the center sample is set to $x_2=0$. This simplification, together with the assumption of constant sampling intervals, does not constitute a reduction in accuracy.

Based on the above conditions and assumptions, it follows that:

$x_1 = -d$ $x_2 = 0$ $x_3 = d$

The equation system presented in the introduction for determining the parameters a, b, and c of the polynomial $y=ax^2+bx+c$ is thereby simplified as follows:

$$y_1 = ad^2 - bd + c$$

$$y_2 = c$$

$$y_3 = ad^2 + bd + c$$

The parameter c can thus be replaced by $y_2$ in the formulae for $y_1$ and $y_3$, so that one obtains the following expression after subtracting the resultant formulae:

$$y_3 - = 2bd$$

Hence, the parameter b being sought has the value $$b = \frac{y_3 - y_1}{2d}.$$

By substituting the values of b and c that are now known in the above equation for calculating $y_1$, one obtains:

$$y_1 = ad^2 - \frac{y_3 - y_1}{2d}d + y_2 = ad^2 - \frac{y_3 - y_1}{2d} + y_2$$

This yields the following expression for the remaining parameter a in the second-order polynomial being sought:

$$a = \frac{y_1 + \frac{y_3 - y_1}{2} - y_2}{d^2}.$$

The parameters obtained in this way can now be substituted in the equation $y=ax^2+bx+c$ in order to calculate any intermediate values.

Since the intervals between adjacent x-values are the same by definition, this interval can be normalized with respect to 1, so that d=1.

The above formulae for the parameters a, b, and c can hence be simplified further as follows:

$$a = \frac{y_1 + y_3}{2} - y_2$$

$$b = \frac{y_3 - y_1}{2}$$

$c=y_2$

The intermediate values lying in the range –d to d, i.e. in the range –1 to 1 about $x_2=0$, can therefore be calculated from the following formula:

$$y = g(x) = x^2\left(\frac{y_1 + y_3}{2} - y_2\right) + x\left(\frac{y_3 - y_1}{2}\right) + y_2$$

A circuitry implementation for calculating intermediate values using this last formula then becomes particularly easy if it is assumed that the points to be calculated are fixed, i.e. the intermediate values are always calculated at the same points. For reasons that will be explained in more detail below, it is particularly advantageous in this case to select the points such that, when one substitutes the corresponding x-values in the above polynomial for the y-values, expressions are obtained that contain only quotients whose denominators can be represented by powers of 2.

According to a first exemplary embodiment of the invention it is hence assumed that the intermediate values are meant to be calculated for the x-values –¾d, –½d, –¼d, ¼d, ½d, and ¾d. As a result of the assumption that d=1, the sample values are thus calculated for x=–⅓, –½, –¼, ¼, ½ and ¼, for which one obtains the following values:

$$g\left(-\frac{3}{4}\right) = \frac{9}{16}\left(\frac{y_1 + y_3}{2} - y_2\right) - \frac{3}{4}\left(\frac{y_3 - y_1}{2}\right) + y_2$$

$$g\left(-\frac{1}{2}\right) = \frac{1}{4}\left(\frac{y_1 + y_3}{2} - y_2\right) - \frac{1}{2}\left(\frac{y_3 - y_1}{2}\right) + y_2$$

$$g\left(-\frac{1}{4}\right) = \frac{1}{16}\left(\frac{y_1 + y_3}{2} - y_2\right) - \frac{1}{4}\left(\frac{y_3 - y_1}{2}\right) + y_2$$

$$g\left(\frac{1}{4}\right) = \frac{1}{16}\left(\frac{y_1 + y_3}{2} - y_2\right) + \frac{1}{4}\left(\frac{y_3 - y_1}{2}\right) + y_2$$

$$g\left(\frac{1}{2}\right) = \frac{1}{4}\left(\frac{y_1 + y_3}{2} - y_2\right) + \frac{1}{2}\left(\frac{y_3 - y_1}{2}\right) + y_2$$

$$g\left(\frac{3}{4}\right) = \frac{9}{16}\left(\frac{y_1 + y_3}{2} - y_2\right) + \frac{3}{4}\left(\frac{y_3 - y_1}{2}\right) + y_2$$

An interpolator that carries out the calculations shown above thus receives at its inputs the three known sample values $y_1$, $y_2$, and $y_3$, and outputs six intermediate values dependent on these y values, as shown in FIG. 1. The interpolator circuit configuration can be optimized by providing blocks that can be used more than once. In addition, in the hardware implementations described below, multiplications are not carried out as such, but are replaced by cleverly selected additions that are much simpler. Since the quotients in the formulae above are exclusively quotients with denominators that can be represented as powers of 2, one can furthermore implement the divisions that need to be carried out by shifting the relevant data lines, i.e. by renaming or giving a new value to the relevant bits of the value to be divided, so that in theory no additional hardware is required for the divisions.

FIG. 3 shows a block diagram of a corresponding interpolator 24, which receives from a sampling block 23 the sample values $y_1$, $y_2$, and $y_3$ that are required for calculating the intermediate values, these sample values having been obtained by the sampling block 23 by sampling the signal in question at constant intervals d=1 in particular.

The interpolator 24 contains two computation blocks 1 and 2, five division or bit-renaming blocks 3 to 7, eight adders 8 to 12 and 16 to 18, and three subtractors 13 to 15. The interconnection of the individual components is shown in FIG. 3.

Figure 4:
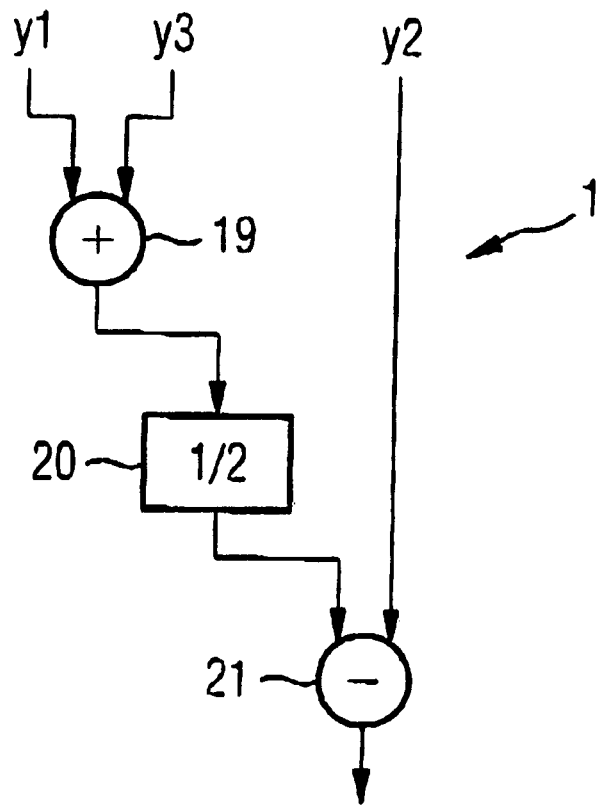
FIG. 4 is a block diagram showing a first computation block of the interpolator shown in FIG. 3.

The computation block 1 is used for calculating the expression $$\frac{y_1 + y_3}{2} - y_2,$$

which is needed for calculating each of the above intermediate values. An example of the configuration of the computation block 1 is shown in FIG. 4, and essentially contains an adder 19 and a subtractor 21. The division by 2 is carried out by a bit-renaming block 20, which shifts the output lines from the adder 19, the bits of the output value of the adder 19 being shifted by one place so that the output value of the adder 19 is halved.

Figure 5:
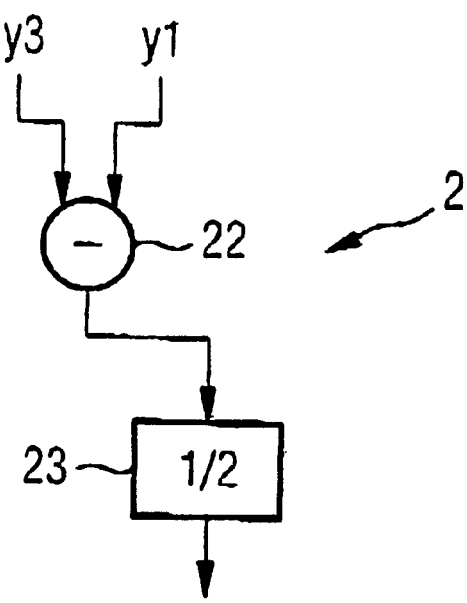
FIG. 5 is a block diagram showing a second computation block of the interpolator shown in FIG. 3.

The computation block 2 is used for calculating the expression $$\frac{y_3 - y_1}{2},$$

which is also needed for calculating each intermediate value. The configuration of the computation block 2 is shown in FIG. 5, and essentially contains a subtractor 22, whose output value is again halved by a bit-renaming block 23, which shifts the data output lines of the subtractor 22.

The circuit proposed here is suitable for fast computations because all the intermediate values are calculated in parallel. The known sample values $y_1$, $y_2$ and $y_3$ applied to the inputs are fed from the sampling block 23 to the inputs of the interpolator at twice the sampling frequency.

Another simplification of the hardware can be achieved if the intermediate values for x=–½, –¼ and ¼ are only calculated by the interpolator. An example of a suitable circuit is shown in FIG. 6, where the elements corresponding to the elements shown in FIG. 5 are given the same reference numbers. In this case, however, new samples are fed at the sampling frequency to the interpolator 24 by the sampling block, so that a calculation must be carried out at every sampling instant in order to calculate all the intermediate values desired. The circuit shown in FIG. 6 does not need more than the four adders 11, 12, 17 and 19, and the four subtractors 14, 15, 21, and 22.

Both the circuits shown calculate an interpolation by which the virtual sampling rate is quadrupled. The circuit shown in FIG. 5 produces six intermediate values in parallel, with new values being applied to the inputs of the interpolator at every second step, so that the elements provided in the circuit shown in FIG. 5 can operate at a significantly slower rate. On the other hand, in the circuit shown in FIG. 6, three intermediate values are calculated but with the inputs having to be reset for each sampling instant.

We claim:

1. A method for determining interpolated intermediate values of a sampled signal, which comprises:

sampling s signal at constant intervals d to obtain at least three known sample values of the signal forming value pairs $(x_1, y_1)$, $(x_2, y_2)$, and $(x_3, y_3)$ respectively;

determining from the three known sample values parameters a, b, and c of a second-order polynomial $y=ax^2+bx+c$;

calculating desired intermediate values from the polynomial after determining the parameters of the polynomial, wherein a center sample value is assigned a sampling instant $x_2=0$, and the interval d between the known sample values is normalized to $d=1$, so that the desired intermediate values are calculated from the second-order polynomial using $$a = \frac{y_1 + y_3}{2} - y_2, \ b = \frac{y_3 - y_1}{2}$$

and $c=y_2$; and choosing the x-values of the desired intermediate values such that the related y-values of the desired intermediate values represented by the second-order polynomial have only quotients with a power of 2 as denominators.

2. The method according to claim 1, which further comprises calculating the intermediate values from the second-order polynomial for $x=-\frac{3}{4}$, $x=-\frac{1}{2}$, $x=-\frac{1}{4}$, $x=\frac{1}{4}$, $x=\frac{1}{2}$, and $x=\frac{3}{4}$.

3. The method according to claim 1, which further comprises calculating the intermediate values from the second-order polynomial for $x=-\frac{1}{2}$, $x=-\frac{1}{4}$, $x=\frac{1}{4}$.

4. The method according to claim 1, which further comprises, when calculating the intermediate values, dividing with a divisor represented by a power of 2 by renaming the bits of the value to be divided.

5. The method according to claim 1, which further comprises, when calculating the intermediate values, multiplying by suitable additions of quotients whose denominators can be represented by a power of 2.

6. The method according to claim 1, which further comprises using as the sampled signal interpolated intermediate values of a sampled digital mobile radio signal.

7. The method according to claim 1, which further comprises, after determining the interpolated intermediate values from the three known sample values, repeating the method again for three known sample values whose sampling instants are shifted by d with respect to the previous three known sample values.

8. An apparatus for determining interpolated intermediate values of a sampled signal by receiving at least three known samples of the signal represented as value pairs $(x_1, y_1)$, $(x_2, y_2)$, and $(x_3, y_3)$ respectively, and determining parameters a, b, and c of a second-order polynomial $y=ax^2+bx+c$ from the three known samples, and then calculating desired intermediate values from the polynomial by assuming a constant time interval d between the known samples $(x_1, y_1)$, $(x_2, y_2)$, and $(x_3, y_3)$ by calculating the desired intermediate values using $$a = \frac{y_1 + y_3}{2} - y_2, \ b = \frac{y_3 - y_1}{2}$$

and $c=y_2$, the apparatus comprising:

a first computation block for calculating the value $$\frac{y_1 + y_3}{2} - y_2;$$

and a second computation block for calculating the value $$\frac{y_3 - y_1}{2},$$

the x-values of the desired intermediate values whose y-values represented by the polynomial have only quotients with a power of 2 as denominators.

9. The apparatus according to claim 8, wherein said first computation block includes:

an adder receiving and adding the known sample values $y_1$ and $y_3$ and outputting output values;

a bit renamer renaming the bits of the output value of the adder to halve the output value of the adder and outputting output values; and a subtractor subtracting the known sample value $y_2$ from the outputs signal from the bit renamer.

10. The apparatus according to claim 9, including:

a first bit-renaming device renaming bits of the output value of the first computation block to output a first, a second, and a third output value from the first bit-renaming device, the first output value equaling half the output value of the first computation block, the second output value equaling the output value of the first computation block divided by 4, and the third output value equals the output value of the first computation block divided by 16;

a second bit-renaming device renaming bits of the output value of the second computation block and outputting a first and a second output value from the second bit-renaming device, the first output value equaling half the output value of the second computation block, and the second output value equaling the output value of the second computation block divided by 4;

first to fifth adders, said first adder adding together the first and third output value of said first bit-renaming device, said second adder adding together the first and second output value of said second bit-renaming device, said third adder adding together the output value of said first adder and the known sample value $y_3$, said fourth adder adding together the second output value of said first bit-renaming device and the known sample value $y_3$, said fifth adder adding together the third output value of said first bit-renaming device and the known sample value $y_3$;

first to third subtractors, said first subtractor subtracting the output value of said second adder from the output value of said third adder and outputting the desired intermediate value for $x=-\frac{3}{4}$, said second subtractor subtracting the first output value of said second bit-renaming device from the output value of said fourth adder and outputs the desired intermediate value for $x=-\frac{1}{2}$, said third subtractor subtracts the second output value of said second bit-renaming device from the output value of said fifth adder and outputting the desired intermediate value for $x=-\frac{1}{4}$; and sixth to eighth-adders, said sixth adder adding together the first output value of said second bit-renaming device and the output value of said fourth adder and outputting the desired intermediate value for $x=\frac{1}{2}$, said seventh adder adding together the second output value of said second bit-renaming device and the output value of said fifth adder and outputs the desired intermediate value for $x=\frac{1}{4}$, and said eighth adder adding together the output value of said second adder and the output value of said third adder and outputs the desired intermediate value for $x=\frac{3}{4}$.

11. The apparatus according to claim 9, for calculating intermediate values from the second-order polynomial for $x=-\frac{1}{2}$, $x=-\frac{1}{4}$, and $x=\frac{1}{4}$.

12. The apparatus according to claim 11, including:

a first bit-renaming device renaming bits of the output value of the first computation block and outputting a first and a second output value from said first bit-renaming device, the first output value equaling the output value of the first computation block divided by 4, and the second output value equaling the output value of the first computation block divided by 16;

a second bit-renaming device renaming bits of the output value of said second computation block and outputting a first and second output value from said second bit-renaming device, the first output value equaling half the output value of said second computation block, and the second output value equaling the output value of said second computation block divided by 4;

a first adder adding together the first output value of said first bit-renaming device and the known sample value $y_3$;

a second adder adding together the second output value of said first bit-renaming device and the known sample value $y_3$, a first subtractor subtracting the first output value of said second bit-renaming device from the output value of said first adder and outputting the desired intermediate value for $x=-\frac{1}{2}$;

a second subtractor subtracting the second output value of said second bit-renaming device from the output value of said second adder and outputting the desired intermediate value for $x=-\frac{1}{4}$; and a third adder adding together the second output value of said second bit-renaming device and the output value of said second adder and outputting the desired intermediate value for $x=\frac{1}{4}$.

13. The apparatus as claimed in claim 9, including:

a first bit-renaming device renaming bits of the output value of the first computation block and outputting a first and a second output value from said first bit-renaming device, the first output value equaling the output value of the first computation block divided by 4, and the second output value equaling the output value of the first computation block divided by 16;

a second bit-renaming device renaming bits of the output value of said second computation block and outputting a first and second output value from said second bit-renaming device, the first output value equaling half the output value of said second computation block, and the second output value equaling the output value of said second computation block divided by 4;

a first adder adding together the first output value of said first bit-renaming device and the known sample value $y_3$;

a second adder adding together the second output value of said first bit-renaming device and the known sample value $y_3$, a first subtractor subtracting the first output value of said second bit-renaming device from the output value of said first adder and outputting the desired intermediate value for $x=-\frac{1}{2}$;

a second subtractor subtracting the second output value of said second bit-renaming device from the output value of said second adder and outputting the desired intermediate value for $x=-\frac{1}{4}$; and a third adder adding together the second output value of said second bit-renaming device and the output value of said second adder and outputting the desired intermediate value for $x=\frac{1}{4}$.

14. The apparatus according to claim 8, wherein said second computation block includes:

a subtractor receiving as input signals the known sample values $y_1$ and $y_3$, subtracting the known sample values, and outputting an output values; and a bit renamer renaming the bits of the output value of the subtractor to halve the output value of the subtractor.

15. The apparatus according to claim 10, including:

a first bit-renaming device renaming bits of the output value of the first computation block to output a first, a second, and a third output value from the first bit-renaming device, the first output value equaling half the output value of the first computation block, the second output value equaling the output value of the first computation block divided by 4, and the third output value equals the output value of the first computation block divided by 16;

a second bit-renaming device renaming bits of the output value of the second computation block and outputting a first and a second output value from the second bit-renaming device, the first output value equaling half the output value of the second computation block, and the second output value equaling the output value of the second computation block divided by 4;

first to fifth adders, said first adder adding together the first and third output value of said first bit-renaming device, said second adder adding together the first and second output value of said second bit-renaming device, said third adder adding together the output value of said first adder and the known sample value $y_3$, said fourth adder adding together the second output value of said first bit-renaming device and the known sample value $y_3$, said fifth adder adding together the third output value of said first bit-renaming device and the known sample value $y_3$;

first to third subtractors, said first subtractor subtracting the output value of said second adder from the output value of said third adder and outputting the desired intermediate value for $x=-\frac{3}{4}$, said second subtractor subtracting the first output value of said second bit-renaming device from the output value of said fourth adder and outputs the desired intermediate value for $x=-\frac{1}{2}$, said third subtractor subtracts the second output value of said second bit-renaming device from the output value of said fifth adder and outputting the desired intermediate value for $x=-\frac{1}{4}$; and sixth to eighth adders, said sixth adder adding together the first output value of said second bit-renaming device and the output value of said fourth adder and outputting the desired intermediate value for $x=\frac{1}{2}$, said seventh adder adding together the second output value of said second bit-renaming device and the output value of said fifth adder and outputs the desired intermediate value for $x=\frac{1}{4}$, and said eighth adder adding together the output value of said second adder and the output value of said third adder and outputs the desired intermediate value for $x=\frac{3}{4}$.

16. The apparatus according to claim 14, for calculating intermediate values from the second-order polynomial for $x=-\frac{1}{2}$, $x=-\frac{1}{4}$, and $x=\frac{1}{4}$.

17. The apparatus according to claim 16, including:
a first bit-renaming device renaming bits of the output value of the first computation block and outputting a first and a second output value from said first bit-renaming device, the first output value equaling the output value of the first computation block divided by 4, and the second output value equaling the output value of the first computation block divided by 16;
a second bit-renaming device renaming bits of the output value of said second computation block and outputting a first and second output value from said second bit-renaming device, the first output value equaling half the output value of said second computation block, and the second output value equaling the output value of said second computation block divided by 4;
a first adder adding together the first output value of said first bit-renaming device and the known sample value $y_3$;
a second adder adding together the second output value of said first bit-renaming device and the known sample value $y_3$,
a first subtractor subtracting the first output value of said second bit-renaming device from the output value of said first adder and outputting the desired intermediate value for $x=-\frac{1}{2}$;
a second subtractor subtracting the second output value of said second bit-renaming device from the output value of said second adder and outputting the desired intermediate value for $x=\frac{1}{4}$; and
a third adder adding together the second output value of said second bit-renaming device and the output value of said second adder and outputting the desired intermediate value for $x=\frac{1}{4}$.

18. The apparatus according to claim 14, including:
a first bit-renaming device renaming bits of the output value of the first computation block and outputting a first and a second output value from said first bit-renaming device, the first output value equaling the output value of the first computation block divided by 4, and the second output value equaling the output value of the first computation block divided by 16;
a second bit-renaming device renaming bits of the output value of said second computation block and outputting a first and second output value from said second bit-renaming device, the first output value equaling half the output value of said second computation block, and the second output value equaling the output value of said second computation block divided by 4;
a first adder adding together the first output value of said first bit-renaming device and the known sample value $y_3$;
a second adder adding together the second output value of said first bit-renaming device and the known sample value $y_3$, a first subtractor subtracting the first output value of said second bit-renaming device from the output value of said first adder and outputting the desired intermediate value for $x=-\frac{1}{2}$;
a second subtractor subtracting the second output value of said second bit-renaming device from the output value of said second adder and outputting the desired intermediate value for $x=-\frac{1}{4}$; and
a third adder adding together the second output value of said second bit-renaming device and the output value of said second adder and outputting the desired intermediate value for $x=\frac{1}{4}$.

19. The apparatus according to claim 8, wherein said first computation block and said second computation block are for calculating intermediate values from the second-order polynomial for $x=-\frac{3}{4}$, $x=-\frac{1}{2}$, $x=-\frac{1}{4}$, $x=\frac{1}{4}$, $x=\frac{1}{2}$, and $x=\frac{3}{4}$.

20. The apparatus according to claim 19, including:
a first bit-renaming device renaming bits of the output value of the first computation block to output a first, a second, and a third output value from the first bit-renaming device, the first output value equaling half the output value of the first computation block, the second output value equaling the output value of the first computation block divided by 4, and the third output value equals the output value of the first computation block divided by 16;
a second bit-renaming device renaming bits of the output value of the second computation block and outputting a first and a second output value from the second bit-renaming device, the first output value equaling half the output value of the second computation block, and the second output value equaling the output value of the second computation block divided by 4;
first to fifth adders, said first adder adding together the first and third output value of said first bit-renaming device, said second adder adding together the first and second output value of said second bit-renaming device, said third adder adding together the output value of said first adder and the known sample value $y_3$, said fourth adder adding together the second output value of said first bit-renaming device and the known sample value $y_3$, said fifth adder adding together the third output value of said first bit-renaming device and the known sample value $y_3$;
first to third subtractors, said first subtractor subtracting the output value of said second adder from the output value of said third adder and outputting the desired intermediate value for $x=-\frac{3}{4}$, said second subtractor subtracting the first output value of said second bit-renaming device from the output value of said fourth adder and outputs the desired intermediate value for $x=-\frac{1}{2}$, said third subtractor subtracts the second output value of said second bit-renaming device from the output value of said fifth adder and outputting the desired intermediate value for $x=-\frac{1}{4}$; and
sixth to eighth adders, said sixth adder adding together the first output value of said second bit-renaming device and the output value of said fourth adder and outputting the desired intermediate value for $x=\frac{1}{2}$, said seventh adder adding together the second output value of said second bit-renaming device and the output value of said fifth adder and outputs the desired intermediate value for $x=\frac{1}{4}$, and said eighth adder adding together the output value of said second adder and the output value of said third adder and outputs the desired intermediate value for $x=\frac{3}{4}$.

21. A method for determining interpolated intermediate values of a sampled signal, which comprises:

receiving at least three known samples of the signal represented as value pairs $(x_1, y_1)$, $(x_2, y_2)$, and $(x_3, y_3)$ respectively;

determining parameters a, b, and c of a second-order polynomial $y=ax^2+bx+c$ from the three known samples, and then calculating desired intermediate values from the polynomial by assuming a constant time interval d between the known samples $(x_1, y_1)$, $(x_2, y_2)$, and $(x_3, y_3)$ by calculating the desired intermediate values using a $$a = \frac{y_1 + y_3}{2} - y_2, \; b = \frac{y_3 - y_1}{2}$$

and $c=y_2$;

providing an apparatus including a first computation block for calculating the value $$\frac{y_1 + y_3}{2} - y_2;$$

and a second computation block (2) for calculating the value $$\frac{y_3 - y_1}{2},$$

the x-values of the desired intermediate values whose y-values represented by the polynomial have only quotients with a power of 2 as denominators; and for calculating intermediate values from the second-order polynomial for $x=-\tfrac{3}{4}$, $x=-\tfrac{1}{2}$, $x=-\tfrac{1}{4}$, $x=\tfrac{1}{2}$, $x=\tfrac{1}{4}$, and $x=\tfrac{3}{4}$; and determining interpolated intermediate values of a sampled digital mobile radio signal.

22. The method according to claim 21, which further comprises:

generating the known sample values of the digital mobile radio signal with a sampling device at constant time intervals d;

normalizing the interval d to d=1 to obtain the known sample values; and assigning a center sample value of the known sample values a sampling instant $x_2=0$.

23. The method according to claim 21, which further comprises:

generating the known sample values of the digital mobile radio signal with a sampling device constant time intervals d;

normalizing the interval d to d=1 to obtain the known sample values; and assigning a center sample value the sampling instant $x_2=0$.

* * * * *